(12) United States Patent
Dunn

(10) Patent No.: US 9,535,293 B2
(45) Date of Patent: Jan. 3, 2017

(54) SEALED TRANSPARENT LIQUID CRYSTAL DISPLAY ASSEMBLY

(71) Applicant: Manufacturing Resources International, Inc., Alpharetta, GA (US)

(72) Inventor: William Dunn, Alpharetta, GA (US)

(73) Assignee: MANUFACTURING RESOURCES INTERNATIONAL, INC., Alpharetta, GA (US)

( * ) Notice: Subject to any disclaimer, the term of this patent is extended or adjusted under 35 U.S.C. 154(b) by 26 days.

(21) Appl. No.: 14/740,581

(22) Filed: Jun. 16, 2015

(65) Prior Publication Data

US 2015/0362768 A1   Dec. 17, 2015

Related U.S. Application Data

(60) Provisional application No. 62/012,559, filed on Jun. 16, 2014.

(51) Int. Cl.
| | |
|---|---|
| *G02F 1/1333* | (2006.01) |
| *G02F 1/1339* | (2006.01) |
| *F21V 8/00* | (2006.01) |
| *A47F 3/00* | (2006.01) |
| *A47F 3/04* | (2006.01) |

(52) U.S. Cl.
CPC ........... *G02F 1/1339* (2013.01); *G02B 6/0068* (2013.01); *G02B 6/0073* (2013.01); *A47F 3/001* (2013.01); *A47F 3/0434* (2013.01); *G02F 2001/13398* (2013.01)

(58) Field of Classification Search
CPC .................................................. G02F 1/1333
See application file for complete search history.

(56) References Cited

U.S. PATENT DOCUMENTS

| | | | |
|---|---|---|---|
| 4,299,092 | A | 11/1981 | Ibrahim |
| 7,922,381 | B2 | 4/2011 | Han |
| 8,683,745 | B2 | 4/2014 | Artwohl |
| 9,052,536 | B2 | 6/2015 | Artwohl et al. |
| 2002/0075552 | A1* | 6/2002 | Poll et al. ................. E06B 3/66 359/275 |
| 2002/0187575 | A1* | 12/2002 | Maruyama et al. ....... H01L 51/5259 438/33 |
| 2005/0265019 | A1 | 12/2005 | Sommers |
| 2007/0151274 | A1 | 7/2007 | Roche |
| 2007/0171647 | A1 | 7/2007 | Artwohl |
| 2008/0055534 | A1 | 3/2008 | Kawano |
| 2008/0284942 | A1 | 11/2008 | Mahama |
| 2009/0002990 | A1 | 1/2009 | Becker |
| 2009/0015400 | A1 | 1/2009 | Breed |
| 2010/0162747 | A1 | 7/2010 | Hamel |
| 2010/0238394 | A1 | 9/2010 | Dunn |

(Continued)

FOREIGN PATENT DOCUMENTS

CN         202815379         3/2013

*Primary Examiner* — Timothy L Rude
(74) *Attorney, Agent, or Firm* — Standley Law Group LLP

(57) ABSTRACT

A sealed, transparent liquid crystal display (LCD) assembly is disclosed. The assembly preferably contains a front and a rear glass panel. The assembly also preferably has a spacer element that is positioned around a perimeter of, and sandwiched between, the front and rear glass panels, thereby providing a gaseous seal. The LCD panel is positioned between the front and rear glass panels. In an exemplary embodiment, a two way light guide would be used within the assembly.

13 Claims, 5 Drawing Sheets

(56) References Cited

U.S. PATENT DOCUMENTS

| | | |
|---|---|---|
| 2011/0083460 A1 | 4/2011 | Thomas |
| 2011/0116000 A1 | 5/2011 | Dunn et al. |
| 2011/0116231 A1 | 5/2011 | Dunn |
| 2012/0287368 A1 | 11/2012 | Que et al. |
| 2013/0016296 A1* | 1/2013 | Fujita et al. .......... H01L 27/322 349/42 |
| 2013/0063326 A1 | 3/2013 | Riegel |
| 2013/0265525 A1 | 10/2013 | Dunn |
| 2013/0271696 A1 | 10/2013 | Dunn |
| 2014/0078407 A1 | 3/2014 | Green |
| 2014/0085564 A1* | 3/2014 | Hendren et al. .. G02F 1/133385 349/58 |
| 2014/0104538 A1 | 4/2014 | Park |
| 2014/0144083 A1 | 5/2014 | Artwohl |
| 2015/0250021 A1 | 9/2015 | Stice et al. |
| 2015/0253612 A1 | 9/2015 | Hasegawa et al. |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |

\* cited by examiner

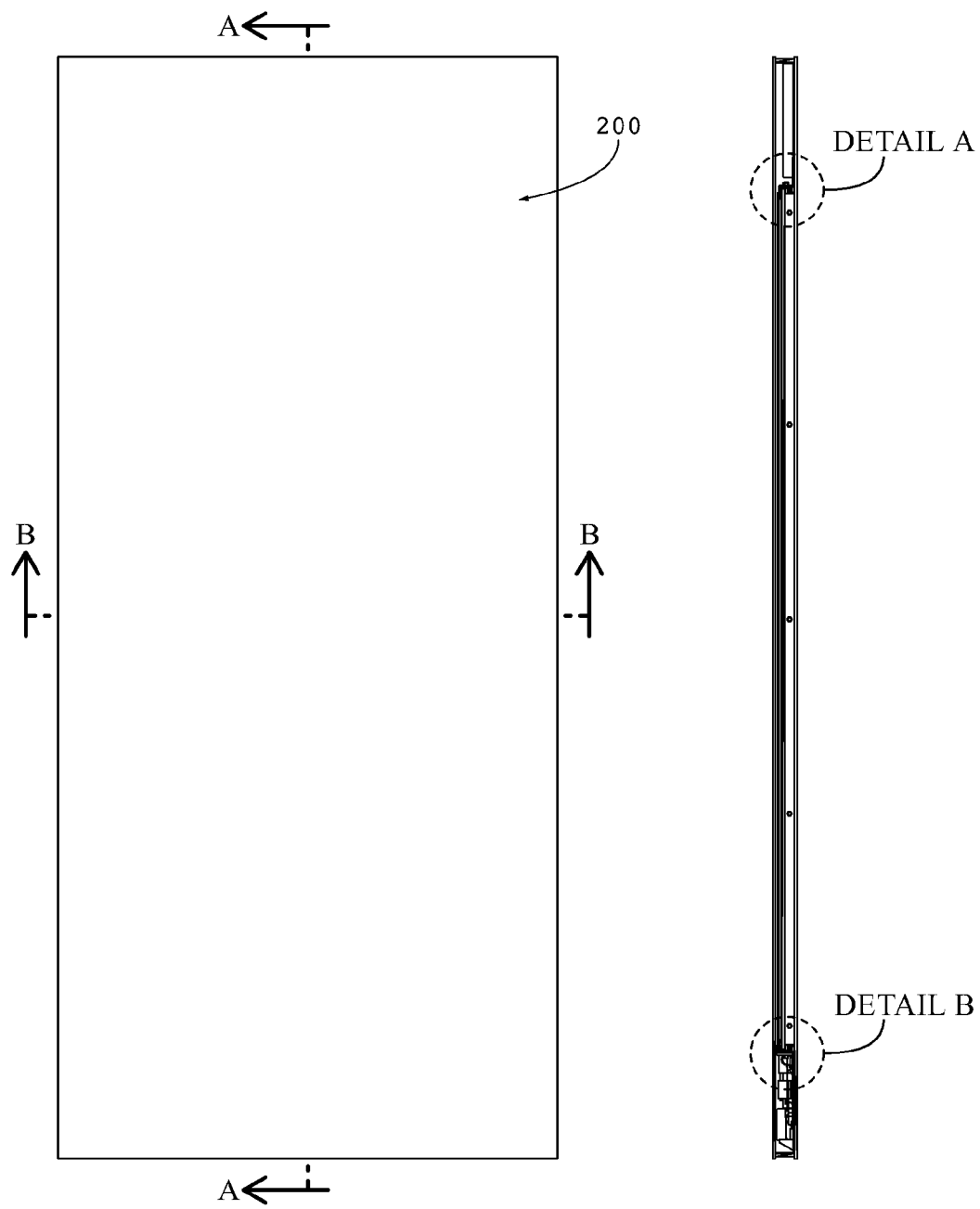
Fig. 4
Fig. 5
Fig. 6

1

SEALED TRANSPARENT LIQUID CRYSTAL DISPLAY ASSEMBLY

CROSS-REFERENCE TO RELATED APPLICATIONS

This application claims priority to U.S. Provisional Application No. 62/012,559 filed on Jun. 16, 2014 and is herein incorporated by reference in its entirety.

TECHNICAL FIELD

Embodiments generally relate to sealed transparent liquid crystal display (LCD).

BACKGROUND OF THE ART

Display cases are used in a number of different retail establishments for illustrating the products that are available for sale. In some instances these display cases may be coolers or freezers which are placed in grocery stores, convenience stores, gas stations, restaurants, or other retail establishments. In other instances these display cases may be non-refrigerated transparent containers used in a jewelry or watch store, bakery, deli, antique shop, sporting goods store, electronics store, or other retail establishments. While the design and appearance of the product itself does provide some point-of-sale (POS) advertising, it has been found that additional advertising at the POS can increase the awareness of a product and in turn create additional sales.

SUMMARY OF THE EXEMPLARY EMBODIMENTS

An exemplary embodiment provides a sealed transparent LCD assembly. The transparent LCD is preferably sealed within a spacer element which is sandwiched between a front and rear glass. LEDs are preferably arranged along the top and bottom edges of a light guide which permits the light to exit both the front and rear surface of the light guide. The top LEDs are preferably placed in thermal communication with a top thermal plate which is placed in conductive thermal communication with the rear glass. Similarly, the bottom LEDs are preferably placed in thermal communication with a bottom thermal plate which is also placed in conductive thermal communication with the rear glass. The light guide is preferably sandwiched between a front and rear bracket but is permitted to float up/down or left/right (as one observes the image on the LCD) to account for thermal expansion/contraction of the light guide.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 4 is a front planar view of the sealed transparent LCD assembly, showing the section lines A-A and B-B.

FIG. 5 is a section view taken along the section line A-A shown in FIG. 4 and indicating Detail A and Detail B.

FIG. 6 is a section view taken along the section line B-B shown in FIG. 4 and indicating Detail C.

DETAILED DESCRIPTION

Figure 1:
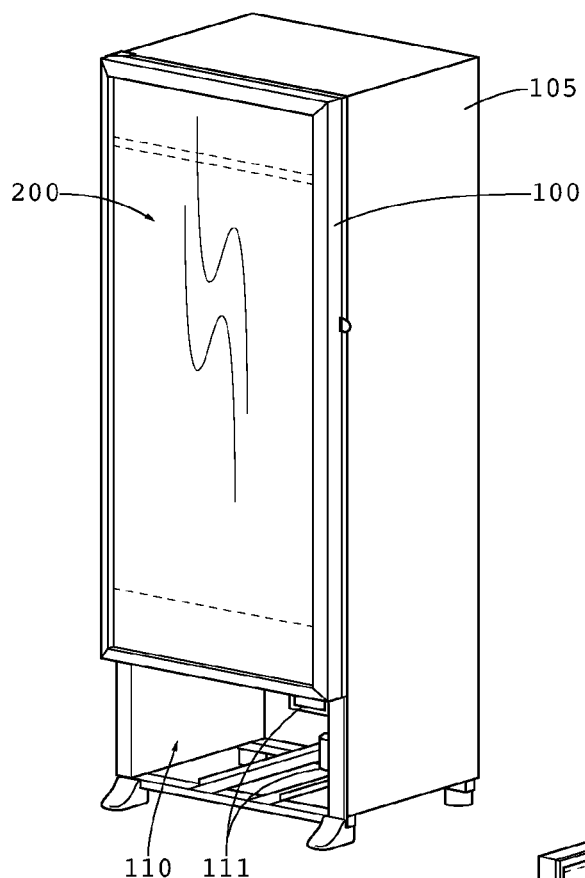
FIG. 1 is a perspective view of a display case having an exemplary sealed transparent LCD assembly.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a display case having an exemplary sealed transparent LCD assembly 200. The display cases described herein can be refrigerated (either simply cooling the products inside or freezing them) or simple room temperature display cases. Generally, the display case includes a housing 105, to which a door frame assembly 100 is fastened. In this embodiment, a cavity 110 is provided below the door frame assembly 100 where various electronic devices 111 for operating the transparent LCD assembly 200 can be located. The electrical devices 111 may include any or all of the following: timing and control board (TCON), video player, hard drive/storage, microprocessor/CPU, wireless transmitter/receiver, cellular data transmitter/receiver, and internet connectivity. At least some of the electrical devices 111 are in electrical communication with the transparent LCD 230.

Figure 2:
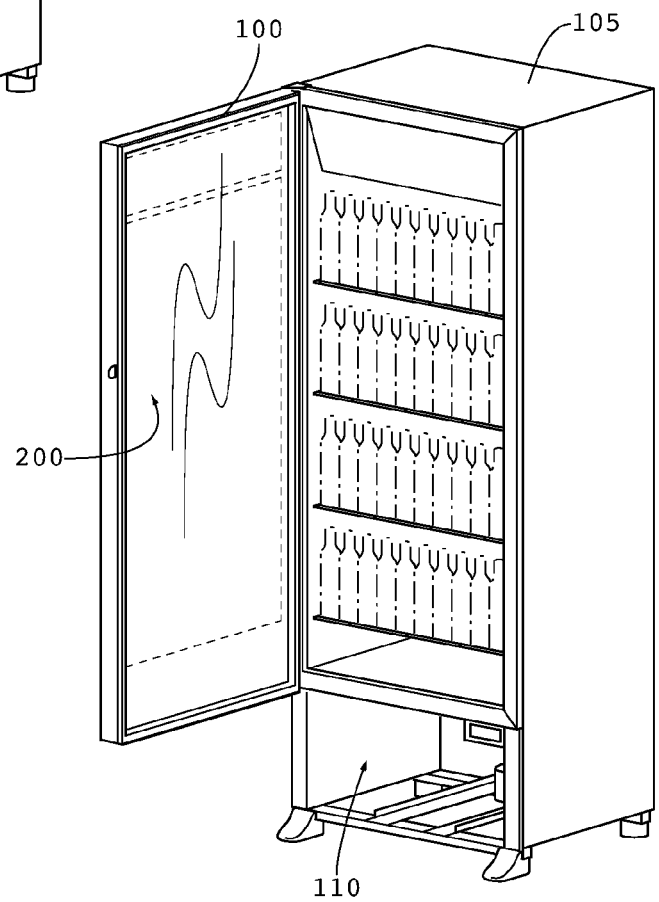
FIG. 2 is a perspective view of the display case of FIG. 1 where the door has been opened.

FIG. 2 is a perspective view of the display case of FIG. 1 where the door has been opened.

Figure 3:
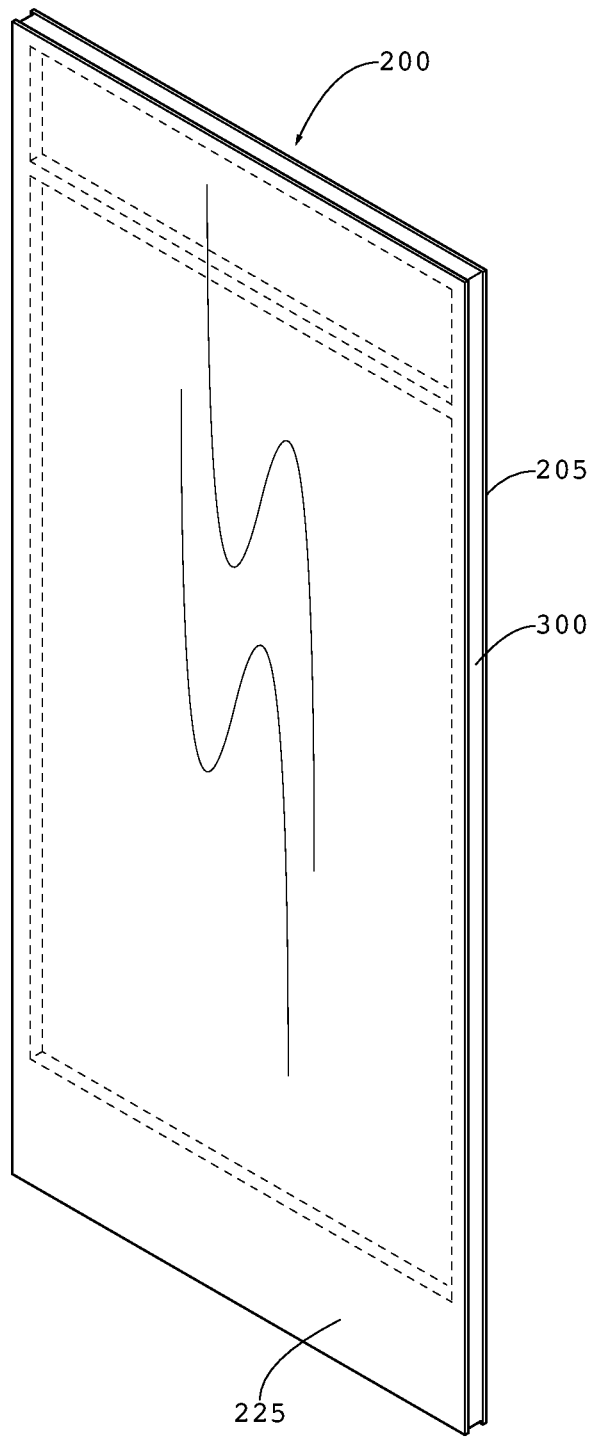
FIG. 3 is a perspective view of the sealed transparent LCD assembly of FIGS. 1-2.

FIG. 3 is a perspective view of the sealed transparent LCD assembly 200 of FIGS. 1-2. Generally speaking, the assembly includes a spacer 300 which is sandwiched between a front glass 225 and rear glass 205. These components are preferably sealed together with an inert gas filling the sealed enclosure. The components are preferably gaseously sealed so that outside gas cannot penetrate into the assembly and any gas sealed within the assembly cannot substantially escape. Although not required for every embodiment, argon gas has been found to be preferred as the gas sealed within the assembly. For gaseously sealing these components together, it is preferable to use a hot melt polyurethane. Preferably, the spacer 300 is the Super Spacer® Standard from Quanex in Cambridge, Ohio. www.quanex.com. In an exemplary embodiment, the spacer 300 would be a flexible foam that contains a desiccant and has a pressure sensitive acrylic adhesive on the front and back edges of the spacer which would be used to bond with the front and rear glass.

FIG. 4 is a front planar view of the sealed transparent LCD assembly, showing the section lines A-A and B-B. FIG. 5 is a section view taken along the section line A-A shown in FIG. 4 and indicating Detail A and Detail B. FIG. 6 is a section view taken along the section line B-B shown in FIG. 4 and indicating Detail C.

Figure 7:
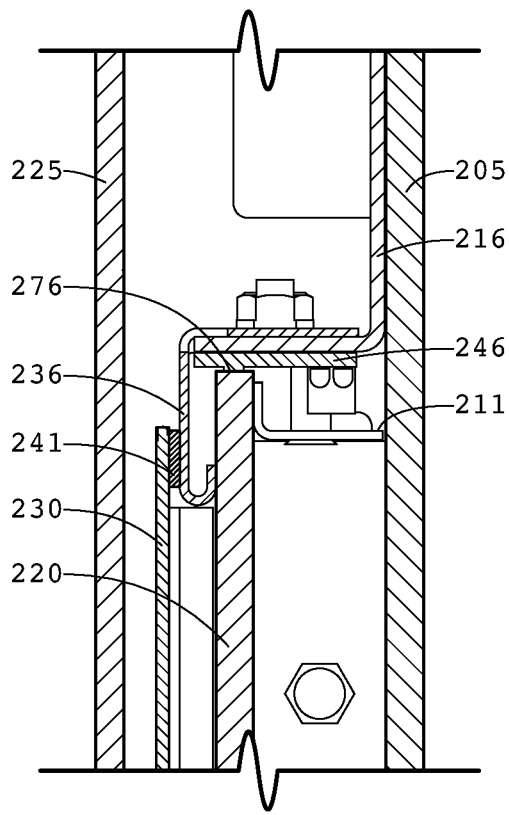
FIG. 7 is a detailed section view of Detail A shown in FIG. 5.

FIG. 7 is a detailed section view of Detail A shown in FIG. 5. A top thermal plate 216 is preferably bonded to the rear glass 205. In an exemplary embodiment, the top thermal plate 216 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 246 containing a plurality of LEDs 276 is preferably attached to the top thermal plate 216 and is preferably in conductive thermal communication with the top thermal plate 216 as well. In this way, heat that is generated by the LEDs 276 can be transmitted to the PCB 246, top thermal plate 216, and eventually transferring to the rear glass 205 where the heat can dissipate through natural or forced convection.

The LEDs 276 are placed adjacent to the edge of a light guide 220 which is sandwiched between a rear bracket 211 and a front bracket 236. Generally speaking, the light guide 220 is only constrained from movement towards the front or back of the assembly, but is not constrained from movement towards the top or sides of the assembly. In other words, the light guide 220 is secured such that it is capable of thermal expansion/contraction in the X-Y direction (horizontal and vertical when observing the LCD), but is fixed in the Z direction (into/out of the assembly when observing the LCD). It could also be said that the light guide 220 is constrained so that it cannot move towards the front or rear glass but otherwise is permitted to float between the rear bracket 211 and front bracket 236. In an exemplary embodiment, the light guide 220 would be the Acrylite® LED Endlighten product available from Evonik Industries. www.acrylite-shop.com.

Preferably, the light guide 220 would contain microscopic diffuse particulate that is homogeneously scattered throughout the sheet. Also preferably, the light emitted from the LEDs 276 and 275 is permitted to exit both the front and rear surfaces of the light guide 220 (in this way, the light guide 220 could be referred to as a 'two way light guide'). In an exemplary embodiment, the light is permitted to exit the rear of the light guide 220 so as to illuminate the products within the display case. Thus, it is preferable that the amount of light permitted to exit the rear surface of the light guide 220 is at least 20% of the amount of light permitted to exit the front surface of the light guide 220.

The transparent LCD 230 is preferably attached to a front surface of the front bracket 236 through a layer of adhesive 241 which would preferably be applied around the perimeter of the LCD 230. In an exemplary embodiment, the adhesive 241 would be VHB tape and preferably 5052 VHB Tape available commercially from 3M™ of St. Paul, Minn. www.3M.com.

Figure 8:
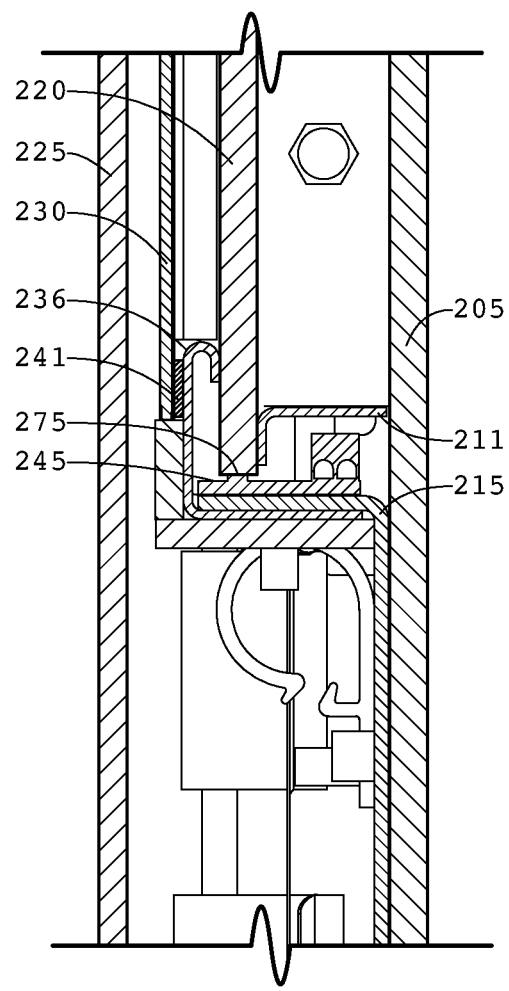
FIG. 8 is a detailed section view of Detail B shown in FIG. 5.

FIG. 8 is a detailed section view of Detail B shown in FIG. 5. A bottom thermal plate 215 is preferably bonded to the rear glass 205. In an exemplary embodiment, the bottom thermal plate 215 is preferably bonded to the rear glass 205 through adhesive transfer tape. An exemplary adhesive transfer tape for this purpose would be 468 MP, available commercially from 3M™ of St. Paul, Minn. www.3M.com/converter. A printed circuit board (PCB) 245 containing a plurality of LEDs 275 is preferably attached to the bottom thermal plate 215 and is preferably in conductive thermal communication with the bottom thermal plate 215 as well. In this way, heat that is generated by the LEDs 275 can be transmitted to the PCB 245, bottom thermal plate 215, and eventually transferring to the rear glass 205 where the heat can dissipate through natural or forced convection.

The LEDs 275 are preferably placed adjacent to the edge of a light guide 220 which is sandwiched between a rear bracket 211 and a front bracket 236. As discussed at length above, the light guide 220 is preferably only constrained from movement towards the front or back of the assembly, but is not constrained from movement towards the top or sides of the assembly.

Figure 9:
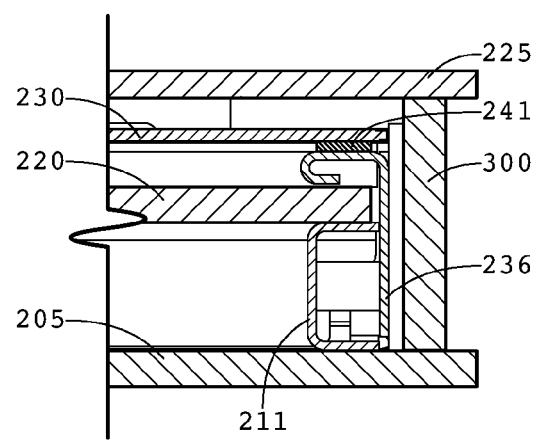
FIG. 9 is a detailed section view of Detail C shown in FIG. 6.

FIG. 9 is a detailed section view of Detail C shown in FIG. 6.

Figure 10:
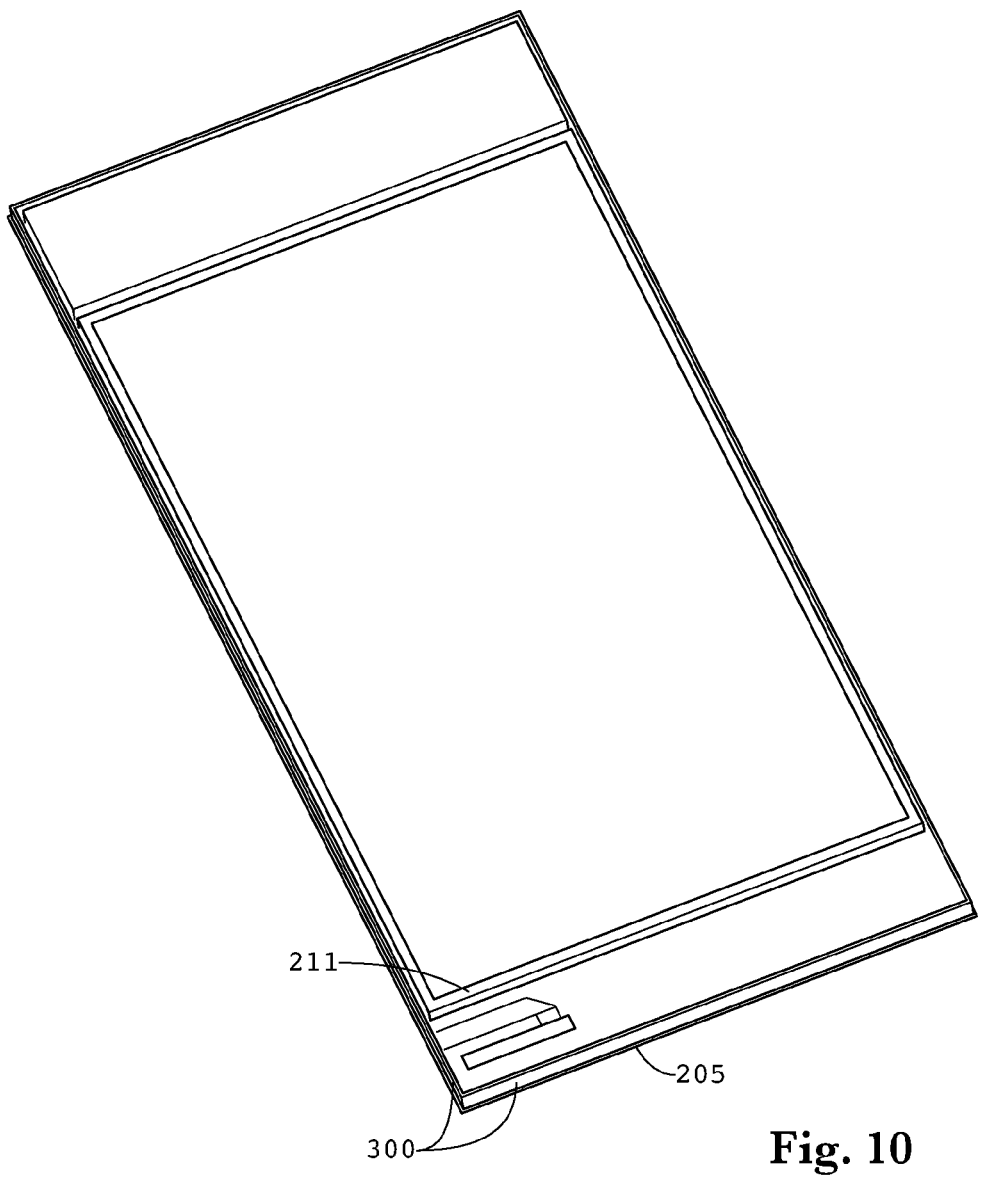
FIG. 10 is a perspective view of a partially assembled exemplary embodiment of a sealed transparent LCD assembly.

FIG. 10 is a perspective view of a partially assembled exemplary embodiment of a sealed transparent LCD assembly. This view shows the rear glass 205 with the spacer 300 attached around the perimeter of the glass 205. Also shown is the rear bracket 211 which is attached to the rear glass 205 as well.

The embodiments of the sealed transparent LCD assembly described herein can be used with any number of display case designs, either temperature controlled or not, and with doors that open or glass that remains stationary.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A sealed transparent LCD assembly comprising:
   a front glass panel;
   a rear glass panel;
   a spacer element positioned around a perimeter of the front and rear glass panels and sandwiched in between the front and rear glass panels to provide a gaseous seal between the front glass panel and the spacer element as well as between the rear glass panel and the spacer element; and a liquid crystal display (LCD) panel positioned between the front and rear glass panels, further comprising:

a light guide positioned between the LCD and the rear glass panel, wherein: the light guide is a two way light guide, and the spacer element is a flexible foam comprising a desiccant and a pressure sensitive acrylic adhesive.

2. The sealed transparent LCD assembly of claim 1, wherein:

said light guide is held between a front bracket and a rear bracket.

3. The sealed transparent LCD assembly of claim 2, wherein:

the light guide is permitted to move vertically but cannot move towards or away from an intended viewer.

4. The sealed transparent LCD assembly of claim 2, wherein:

the LCD is attached to a front surface of the front bracket.

5. The sealed transparent LCD assembly of claim 1, wherein:

the LCD is sealed within the assembly so that exterior air cannot contact the LCD.

6. A sealed transparent LCD assembly comprising:

a front glass panel; a rear glass panel;

a liquid crystal display comprising a two way light guide positioned between the front glass and rear glass panels;

a spacer element which surrounds the liquid crystal display and is sandwiched in between the front and rear glass panels, wherein:

the spacer element is a flexible foam comprising a desiccant and a pressure sensitive acrylic adhesive.

7. The sealed transparent LCD assembly of claim 6, wherein:

the spacer element is bonded to the front and rear glass panels.

8. The sealed transparent LCD assembly of claim 7, wherein:

the spacer element creates a gaseous seal between the front glass panel and the spacer element, as well as between the rear glass panel and the spacer element.

9. The sealed transparent LCD assembly of claim 8, wherein:

the gaseous seal does not allow gas from outside the assembly to contact the LCD.

10. The sealed transparent LCD assembly of claim 9, wherein:

the gaseous seal does not allow gas from inside the assembly to escape.

11. A sealed transparent LCD assembly comprising:

a front glass panel;

a rear glass panel;

a spacer element positioned around a perimeter of the front and rear glass panels and sandwiched in between the front and rear glass panels to define a gaseously sealed cavity; and a liquid crystal display (LCD) panel positioned within the cavity and a a two way light guide positioned between the rear glass and the LCD, wherein:

the spacer element is a flexible foam comprising a desiccant and a pressure sensitive acrylic adhesive.

12. The sealed transparent LCD assembly of claim 11, further comprising:

an inert gas which substantially fills the cavity.

13. The sealed transparent LCD assembly of claim 12, further comprising:

a plurality of LEDs arranged along an edge of the light guide.

* * * * *